United States Patent
Nagara et al.

(10) Patent No.: US 9,094,664 B2
(45) Date of Patent: Jul. 28, 2015

(54) IMAGE PROCESSING DEVICE, IMAGE PROCESSING METHOD, AND PROGRAM

(75) Inventors: Toru Nagara, Tokyo (JP); Tomoya Yamaura, Tokyo (JP)

(73) Assignee: Sony Corporation (JP)

( * ) Notice: Subject to any disclaimer, the term of this patent is extended or adjusted under 35 U.S.C. 154(b) by 398 days.

(21) Appl. No.: 13/345,010

(22) Filed: Jan. 6, 2012

(65) Prior Publication Data

US 2012/0183231 A1    Jul. 19, 2012

(30) Foreign Application Priority Data

Jan. 13, 2011    (JP) ................................ P2011-005015

(51) Int. Cl.
*H04N 13/00*    (2006.01)
*H04N 19/597*    (2014.01)

(52) U.S. Cl.
CPC ....... *H04N 13/0048* (2013.01); *H04N 13/0059* (2013.01); *H04N 13/0062* (2013.01); *H04N 19/597* (2013.01)

(58) Field of Classification Search
CPC .................. H04N 19/00781; H04N 19/00387; H04N 19/00278; H04N 19/00533; H04N 19/002; H04N 19/00266; H04N 19/00872; H04N 19/00903; H04N 13/0048; H04N 13/0059; H04N 19/00272; G06T 2207/20021
See application file for complete search history.

(56) References Cited

U.S. PATENT DOCUMENTS

| | | | | |
|---|---|---|---|---|
| 5,991,453 | A * | 11/1999 | Kweon et al. | 382/250 |
| 6,035,070 | A * | 3/2000 | Moon et al. | 382/243 |
| 6,064,696 | A * | 5/2000 | Kato et al. | 375/240.03 |
| 6,307,885 | B1 * | 10/2001 | Moon et al. | 375/240.08 |
| 6,683,992 | B2 * | 1/2004 | Takahashi et al. | 382/243 |
| 6,963,671 | B2 | 11/2005 | Frisken et al. | |
| 2005/0149831 | A1 * | 7/2005 | Katsavounidis et al. | 714/776 |
| 2005/0254584 | A1 * | 11/2005 | Kim et al. | 375/240.27 |
| 2006/0256868 | A1 * | 11/2006 | Westerman | 375/240.24 |
| 2008/0130984 | A1 * | 6/2008 | Ahn et al. | 382/154 |
| 2009/0109281 | A1 * | 4/2009 | Mashitani et al. | 348/43 |
| 2009/0263007 | A1 * | 10/2009 | Kitaura et al. | 382/154 |
| 2010/0208799 | A1 * | 8/2010 | Park et al. | 375/240.08 |
| 2011/0103701 | A1 * | 5/2011 | Cheon | 382/233 |
| 2012/0140827 | A1 * | 6/2012 | Kobayashi | 375/240.16 |
| 2012/0207211 | A1 * | 8/2012 | Song et al. | 375/240.03 |

FOREIGN PATENT DOCUMENTS

| | | |
|---|---|---|
| EP | 1501318 A1 | 1/2005 |
| EP | 1901236 A1 | 3/2008 |
| EP | 1912446 A1 | 4/2008 |
| JP | 2004-038933 A | 2/2004 |

OTHER PUBLICATIONS

European Search Report EP 11190473, dated Apr. 26, 2012.

* cited by examiner

*Primary Examiner* — Jingge Wu

(74) *Attorney, Agent, or Firm* — Lerner, David, Littenberg, Krumholz & Mentlik, LLP

(57) ABSTRACT

Provided is an image processing device including a frame image generation unit for generating a frame image in which a first image and a second image are arranged next to each other, and a compression processing unit for compressing the frame image in units of macroblocks. The frame image generation unit arranges the first image and the second image such that a boundary between the first image and the second image coincides with boundaries of the macroblocks.

12 Claims, 13 Drawing Sheets

IMAGE PROCESSING DEVICE, IMAGE PROCESSING METHOD, AND PROGRAM

CROSS-REFERENCE TO RELATED APPLICATION

The present application claims priority from Japanese Patent Application No. JP 2011-005015 filed in the Japanese Patent Office on Jan. 13, 2011, the entire content of which is incorporated herein by reference.

BACKGROUND

The present disclosure relates to an image processing device, an image processing method, and a program.

These days, 3D display devices capable of enabling a user to perceive a stereoscopic image by displaying an image for a left eye and an image for a right eye are distributed. The 3D display devices are expected to become more widely spread in the future because TV videos and movies created for 3D visualization are on the increase, and also because technologies for converting a 2D image into a 3D image are being actively pursued, for example. Additionally, JP 2004-38933A can be cited as a document describing a 3D display device.

Furthermore, a wireless LAN (Local Area Network) system as typified by IEEE (Institute of Electrical and Electronics Engineers) 802.11 is becoming increasingly common in place of a wired network for its advantages such as high flexibility of equipment.

A wireless LAN system standardized by the IEEE 802.11 is composed of a group of wireless communication devices which are an access point operating as a master unit and a plurality of stations operating as slave units, and a plurality of stations are connected to one access point.

Furthermore, according to Wi-Fi Direct under Wi-Fi Alliance, it is proposed to form a communication group by determining which of a group owner and a client each of a plurality of wireless communication devices acts as. The wireless communication device acting as the group owner and the wireless communication device acting as the client forming the communication group may directly and wirelessly communicate with each other.

SUMMARY

However, the transmission rate of the current wireless communication and the transmission rates of some wired methods are not enough to communicate uncompressed images. Thus, a case is assumed where, to communicate the above described 3D image, the 3D image is compressed.

In light of the foregoing, it is desirable to provide an image processing device, an image processing method, and a program which are novel and improved, and which are capable of compressing an image in such a way that the reproduction quality is improved.

According to an embodiment of the present disclosure, there is provided an image processing device which includes a frame image generation unit for generating a frame image in which a first image and a second image are arranged next to each other, and a compression processing unit for compressing the frame image in units of macroblocks. The frame image generation unit arranges the first image and the second image such that a boundary between the first image and the second image coincides with boundaries of the macroblocks.

The frame image generation unit may cause the boundary between the first image and the second image to coincide with the boundaries of the macroblocks by inserting dummy data to both sides of the first image and the second image in a direction of arrangement.

The frame image generation unit may multiply a double value of the number of macroblocks necessary to store the first image or the second image along the direction of arrangement by the number of pixels of the macroblock in the direction of arrangement, and distribute as the dummy data, to both sides of the frame image in the direction of arrangement, a difference between a multiplication result and the number of effective pixels of the frame image in the direction of arrangement.

The frame image generation unit may distribute, in a case the numbers of effective pixels of the first image and the second image along the direction of arrangement are same, the dummy data equally to both sides of the frame image in the direction of arrangement, and distribute, in a case the numbers of effective pixels of the first image and the second image along the direction of arrangement are different, more dummy data to an arrangement side of an image with a fewer number of effective pixels than on another side.

The image processing device may further include a wireless communication unit for wirelessly transmitting the frame image which has been compressed by the compression processing unit.

The number of effective pixels of the frame image in the direction of arrangement may be different from an even multiple of the number of pixels of the macroblock in the direction of arrangement.

The first image may be an image for a left eye and the second image may be an image for a right eye.

According to another embodiment of the present disclosure, there is provided an image processing method which includes generating a frame image in which a first image and a second image are arranged next to each other, and compressing the frame image in units of macroblocks. In the step of generating a frame image, the first image and the second image are arranged such that a boundary between the first image and the second image coincides with boundaries of the macroblocks.

According to another embodiment of the present disclosure, there is provided a program for causing a computer to function as an image processing device which includes a frame image generation unit for generating a frame image in which a first image and a second image are arranged next to each other, and a compression processing unit for compressing the frame image in units of macroblocks. The frame image generation unit arranges the first image and the second image such that a boundary between the first image and the second image coincides with boundaries of the macroblocks.

According to the embodiments of the present disclosure described above, an image can be compressed in such a way that the reproduction quality is improved.

DETAILED DESCRIPTION OF THE EMBODIMENT(S)

Figure 1:
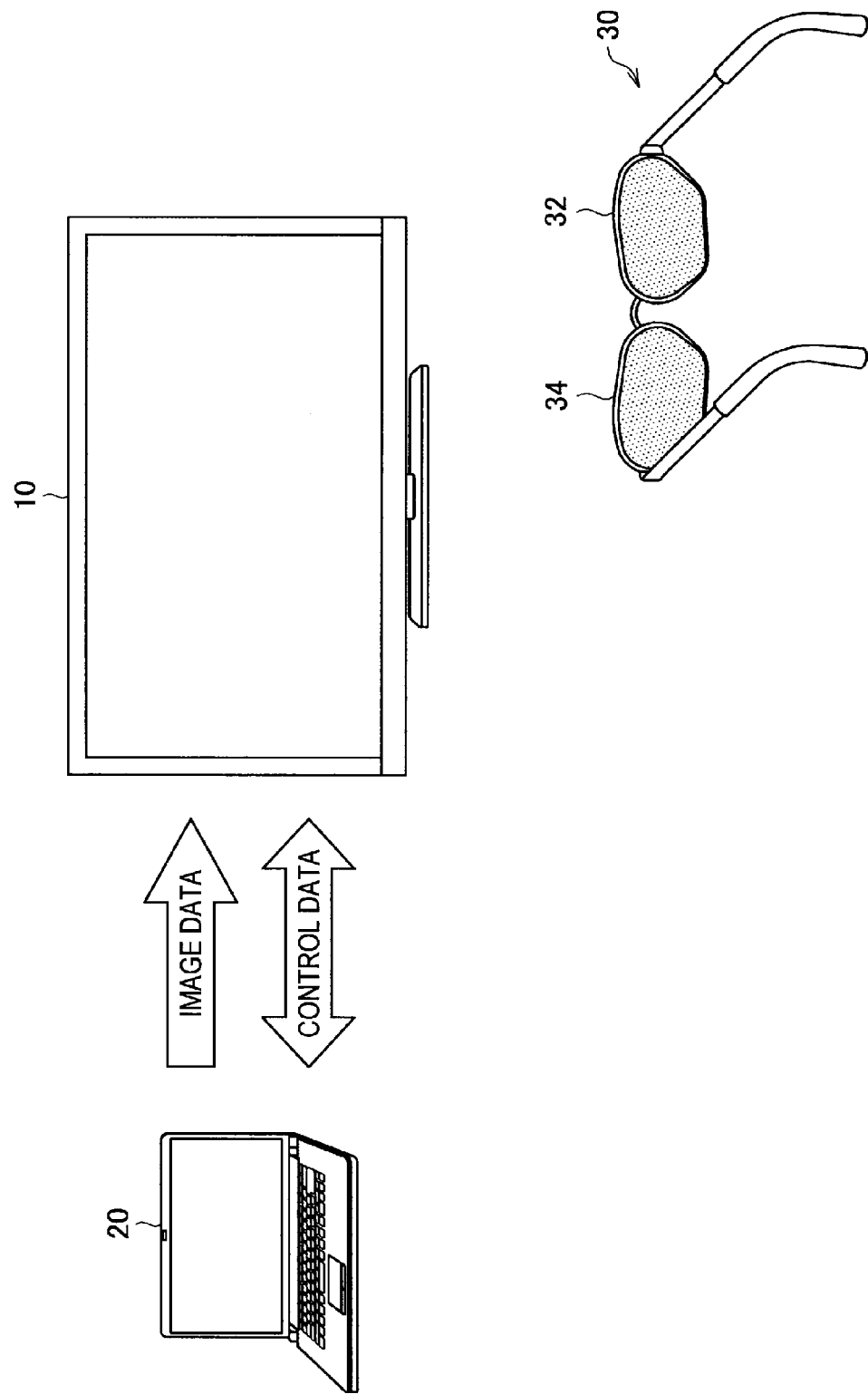
FIG. 1 is an explanatory diagram showing a configuration of an image reproduction system according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

In this specification and the drawings, a plurality of structural elements having substantially the same function are sometimes distinguished from each other by being added a different alphabetical letter to the same reference numeral. However, if it is not particularly necessary to distinguish each of a plurality of structural elements having substantially the same functional configuration, only the same reference numeral is assigned.

Furthermore, "DETAILED DESCRIPTION OF THE EMBODIMENT(S)" will be described in the following order.
1. Overview of Image Reproduction System
2. Hardware Configuration
3. First Embodiment
3-1. Configurations of PC and Display Device
3-2. Operations of PC and Display Device
4. Second Embodiment
5. Conclusion

1. Overview of Image Reproduction System

FIG. 1 is an explanatory diagram showing a configuration of an image reproduction system 1 according to an embodiment of the present disclosure. As shown in FIG. 1, the image reproduction system 1 according to an embodiment of the present disclosure includes a display device 10, a PC 20, and shutter glasses 30.

The PC (Personal Computer) 20 has a function of connecting and wirelessly communicating with a nearby wireless communication device such as the display device 10. For example, the PC 20 can form a communication group with the display device 10 according to Wi-Fi Direct under Wi-Fi Alliance standard development and wirelessly communicate with the display device 10 in the communication group without using an access point.

Furthermore, forming the communication group with the display device 10, the PC 20 can transmit content data, control data and the like to the display device 10. In this specification, an embodiment is mainly described in which image data composed of a plurality of frame images composed of an R image and an L image is transmitted as an example of the content data. The image data may be data such as movie, television program or video program, a user's work screen in the PC 20, or a display screen of a game. The content data, however, is not limited to the image data, and audio data such as music, lecture, or radio program may also be transmitted as the content data from the PC 20.

A layer in which the image data and the control data are communicated is described hereinafter with reference to FIG. 2.

Figure 2:
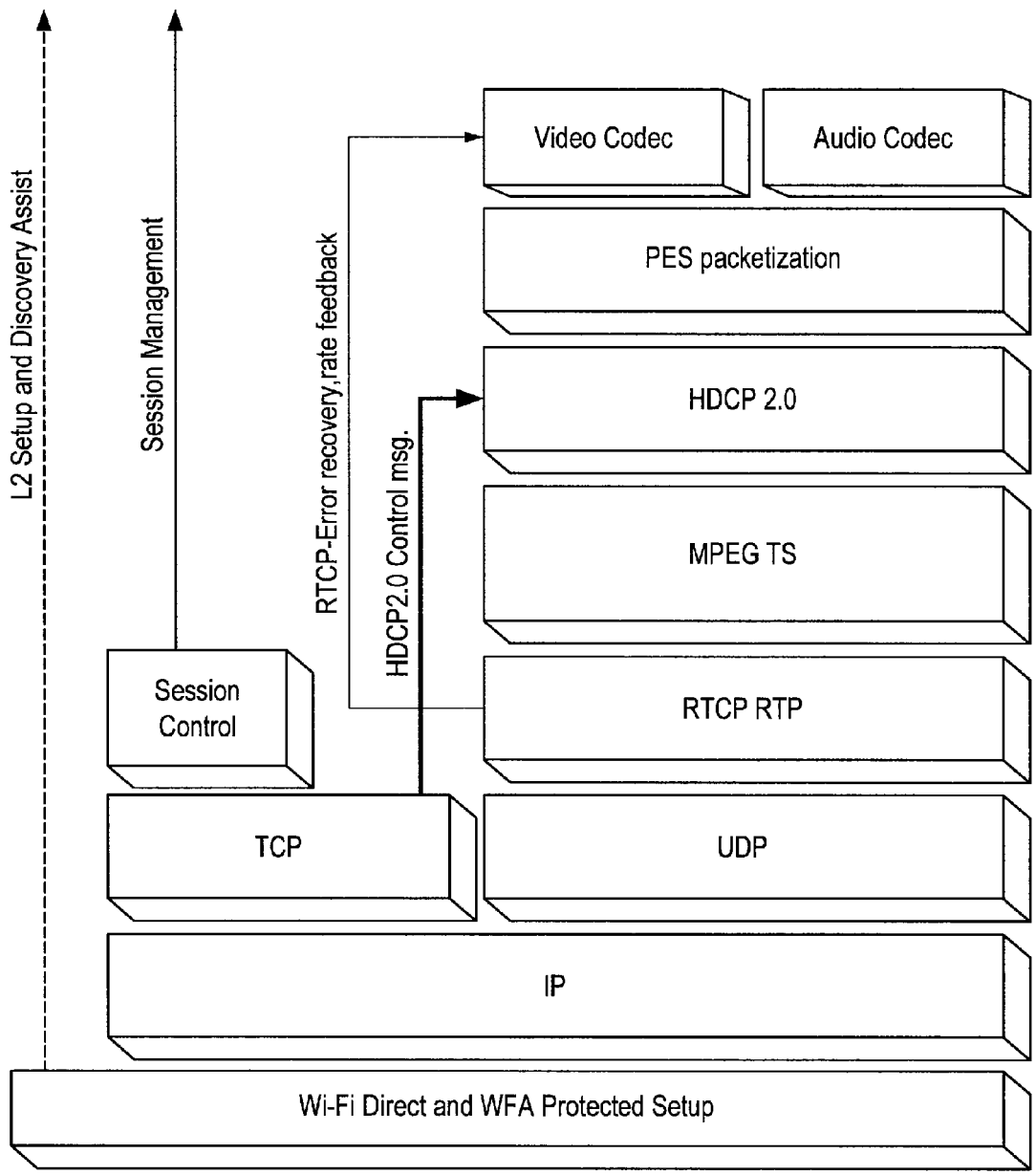
FIG. 2 is an explanatory diagram showing a software concept of a PC.

FIG. 2 is an explanatory diagram showing a software concept of the PC 20. As shown in FIG. 2, the content data such as the image data is transmitted using MPEG-TS/RTP/UDP/IP and the like. On the other hand, the control data is transmitted through a communication path different from that of the image data, such as fTCP/IP or L2 layer.

Additionally, FIG. 1 shows the PC 20 merely as an example of the image processing device, and the image processing device is not limited to the PC 20. For example, the image processing device may be an information processing apparatus such as a home video processing device (e.g. a DVD recorder, a videocassette recorder, etc.), a PDA (Personal Digital Assistants), a mobile phone, a home game machine, a portable video processing device, a portable game machine or an electrical household appliance.

The display device 10 has a function of connecting and wirelessly communicating with a nearby wireless communication device such as the PC 20. For example, the display device 10 can form a communication group with the PC according to Wi-Fi Direct under Wi-Fi Alliance standard development and wirelessly communicate with the PC 20 in the communication group without using an access point. Additionally, the display device 10 and the PC 20 may perform direct communication using IEEE802.11z (TDLS), for example, even when they are connected to the same access point (AP). Furthermore, the display device 10 and the PC 20 may also communicate by wire.

Furthermore, forming the communication group with the PC 20, the display device 10 can receive the image data transmitted from the PC 20 and display the received image data. In this configuration, a user can display the image data processed in the PC 20 on the display device 10 with a larger screen without complicated work.

Furthermore, by displaying an L image for a left eye and an R image for a right eye, the display device 10 can allow a user wearing the shutter glasses 30 to perceive a stereoscopic image.

The shutter glasses 30 include an R image transmission unit 32 and an L image transmission unit 34 formed of liquid crystal shutters, for example. The shutter glasses 30 perform an opening/closing operation of the R image transmission unit 32 and the L image transmission unit 34 according to signals transmitted from the display device 10. A user is allowed to perceive the L image and the R image displayed on the display device 10 as a stereoscopic image by looking at the light emitted from the display device 10 via the R image transmission unit 32 and the L image transmission unit 34 of the shutter glasses 30.

On the other hand, when an ordinary 2D image is displayed on the display device 10, the user is allowed to perceive the image displayed on the display device 10 as an ordinary 2D image by directly looking at the light emitted from the display device 10.

Additionally, FIG. 1 shows the display device 10 merely as an example of the image reproduction device, and the image reproduction device is not limited to the display device 10. For example, the image reproduction device may be any information processing device having an image reproduction function, such as a PC or a video processing device.

Furthermore, although an example in which a wireless communication function is implemented in the PC 20 and the display device 10 is illustrated in FIG. 1, the embodiment is not limited to such an example. For example, an adapter having a wireless communication function, an image data encoding function and a packetization function may be externally attached to the PC 20. Likewise, an adapter having a wireless communication function, an image data decoding function and the like may be externally attached to the display device 10.

Furthermore, a control method that uses a shutter operation to cause the L image to be perceived by the left eye and the R image to be perceived by the right eye has been described above, but the control method is not limited to such an example. For example, an equivalent effect may be obtained also by using a polarizing filter for a left eye and a polarizing filter for a right eye.

Also, in the present specification, an example is described in which the PC 20 transmits, as one frame image, the R image and the L image as a first image and a second image, but the first image and the second image may be independent images. For example, the first image may be an image for a first user, and the second image may be an image for a second user. More particularly, the first image and the second image may be a game screen, a program screen, or the like for respective users.

(Background)

Now, as a method used by the PC 20 to store the L image and the R image into one frame image, there are a side-by-side method and a top-and-bottom method. The side-by-side method is a method of arranging the L image and the R image next to each other in the horizontal direction, and the top-and-bottom method is a method of arranging the L image and the R image next to each other in the vertical direction.

Also, in the case of performing communication by wire such as HDMI, since there is a margin to the maximum transmission rate and also the error rate is sufficiently low, the PC 20 can also separately digitally transmit each pixel without compressing the frame image. Accordingly, transmission of each pixel is not affected by other part of the image. On the other hand, in the case of wirelessly transmitting the frame image to the display device 10, since the current wireless bandwidth is not enough for transmission of an uncompressed frame image, the frame image is compressed. Other technologies have several issues related to this compression. In the following, this will be described in detail with reference to FIGS. 3 and 4.

Figure 3:
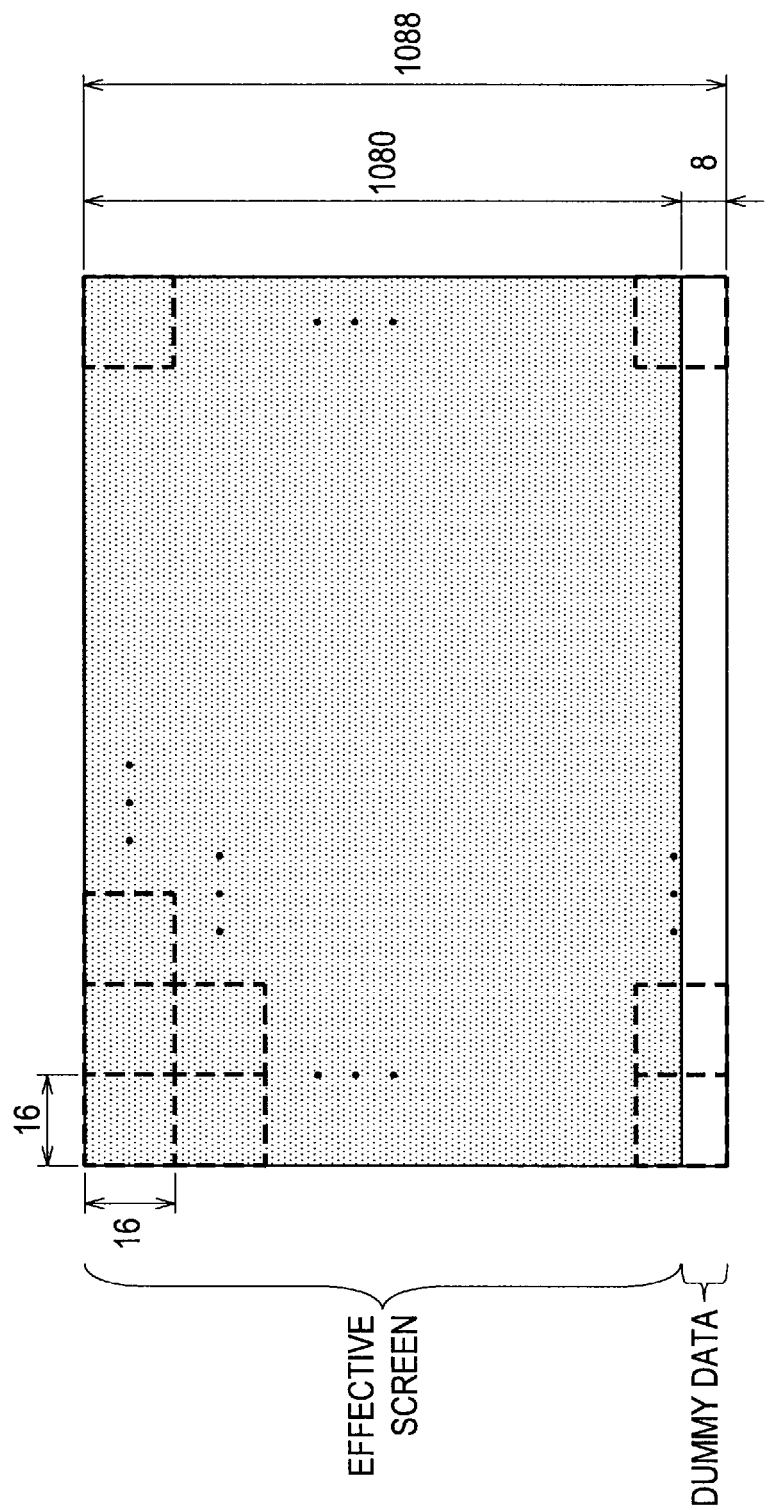
FIG. 3 is an explanatory diagram showing a compression method of a 2D image.

FIG. 3 is an explanatory diagram showing a compression method of a 2D image. The image processing device compresses a 2D image which is the target of compression in units of pixel areas called macroblocks. Generally, a macroblock is a pixel area of 16*16 pixels. Thus, in the case of compressing a 2D image whose effective screen size in the vertical direction is 1080 pixels, there is a shortage, at the lower edge, of pixels for forming one macroblock, as shown in FIG. 3, and thus dummy data of 8 pixels is inserted at the lower edge. An image processing device according to another technology performs a similar process to a 3D frame image composed of an L image and an R image, as will be described below with reference to FIG. 4.

Figure 4:
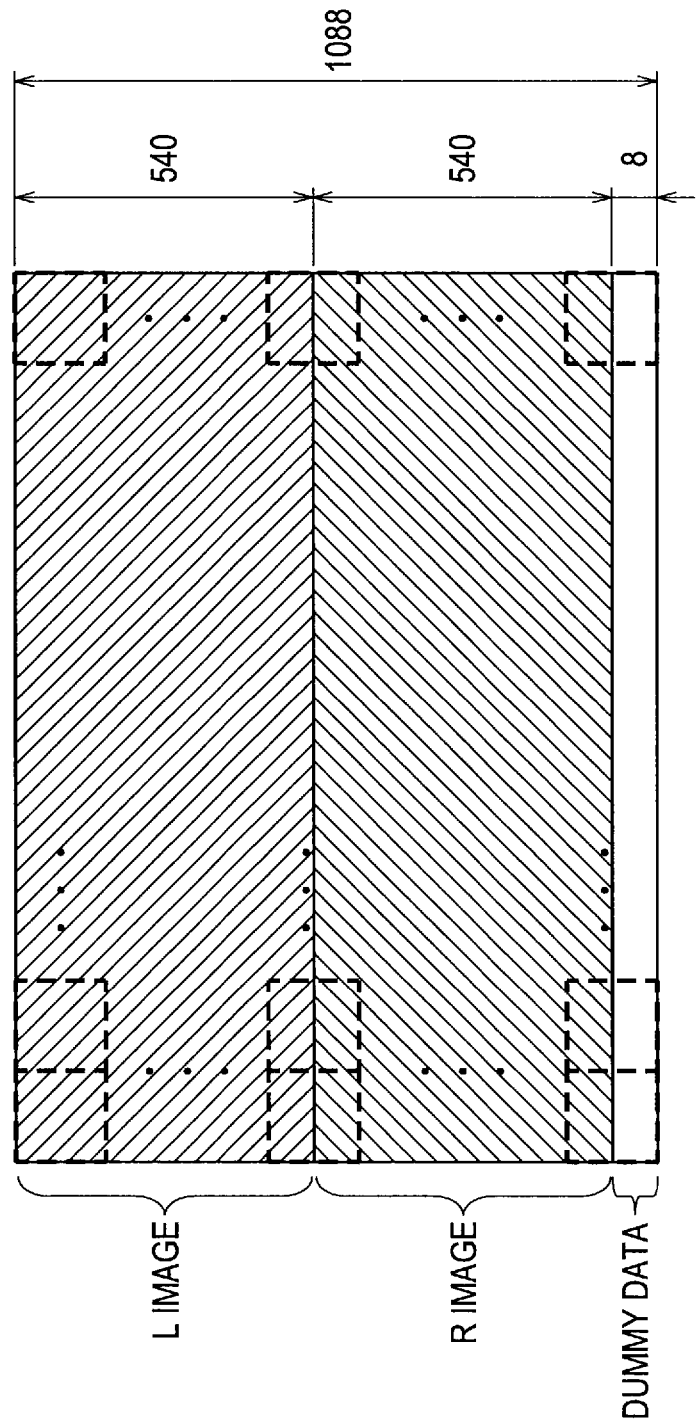
FIG. 4 is an explanatory diagram showing a compression method of a 3D frame image by another technology.

FIG. 4 is an explanatory diagram showing a compression method of a 3D frame image by another technology. As shown in FIG. 4, in the case the number of pixels in the vertical direction is 540 for the L image and the R image, an image processing device according to another technology inserts, in the same manner as in the example shown in FIG. 3, dummy data of 8 pixels at the lower edge, and compresses the frame image in units of macroblocks. Additionally, the rectangular areas outlined by dotted lines correspond to the macroblocks.

However, in the case there is a macroblock extending across the lower portion of the L image and the upper portion of the R image, as shown in FIG. 4, the state of compression of one image changes depending on the state of compression of the other image. Accordingly, even if the lower portion of the L image is a still image for over a plurality of frame images, if the upper portion of the R image includes movement, the way the L image is compressed is changed under the influence of the movement. Thus, with respect to the subjective image quality, the lower portion of the L image may waver. For example, such an issue as described above may arise in frame images in which a person is running on the ground.

Furthermore, generally, wireless communication has a high error rate and poor transmission quality compared to wired communication. Accordingly, if a frame image which has been compressed in the above manner is wirelessly transmitted, a data loss is expected to occur. Particularly, UDP is used instead of TCP in an application for which reduction in the transmission delay is desired, and thus the rate of occurrence of a data loss is high. When such a data loss occurs, a 2D image will have only one corrupted portion in the image at the time of reproduction, but if the data loss occurs in the macroblock extending across the lower portion of the L image and the upper portion of the R image, two portions, namely the lower portion of the L image and the upper portion of the R image, will be corrupted.

Furthermore, in normal broadcasting, display is performed with overscan and errors present at the edges of the screen are not likely to be perceived by the user, but display is not performed with overscan in all cases. Particularly, with content related to the PC, display is performed in many cases in a full pixel mode. In this case, the image corruptions at the edges are easily perceived by the user.

Accordingly, embodiments of the present disclosure have come to be made from the standpoint of the circumstances described above. According to the embodiments of the present disclosure, a 3D frame image may be compressed in such a way that the reproduction quality is improved. In the following, the hardware configuration of the PC 20 and the display device 10 will be described first, and then, each embodiment of the present disclosure as described above will be described in detail.

2. Hardware Configuration

Figure 5:
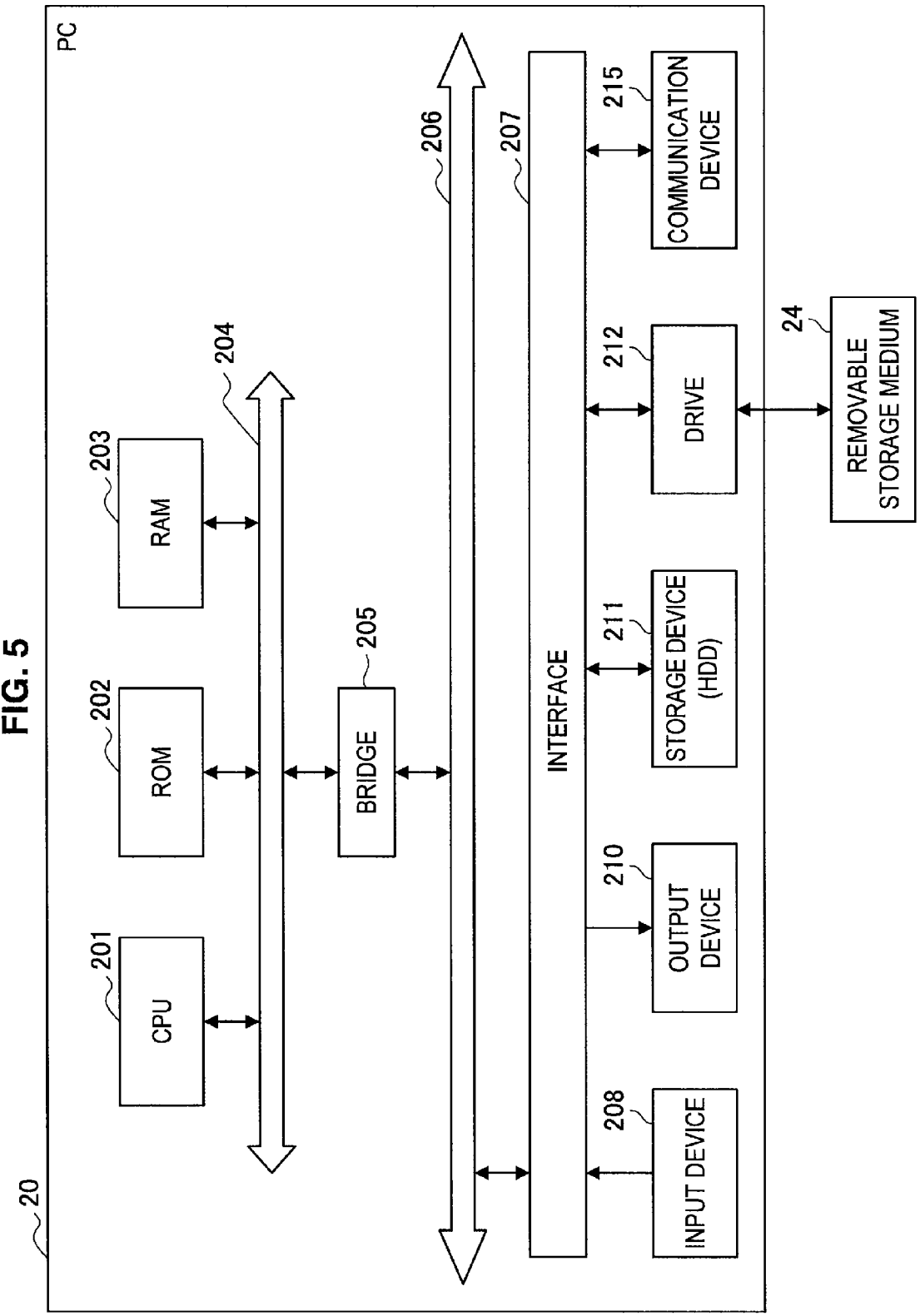
FIG. 5 is an explanatory diagram showing a hardware configuration of a PC according to an embodiment of the present disclosure.

FIG. 5 is an explanatory diagram showing a hardware configuration of the PC 20 according to the embodiment of the present disclosure. The PC 20 includes a CPU (Central Processing Unit) 201, a ROM (Read Only Memory) 202, a RAM (Random Access Memory) 203, and a host bus 204. The PC 20 further includes a bridge 205, an external bus 206, an interface 207, an input device 208, an output device 210, a storage device (HDD) 211, a drive 212, and a communication device 215.

The CPU 201 functions as a processing device and a control device, and it controls the overall operation in the PC 20 according to programs. The CPU 201 may be a microprocessor. The ROM 202 stores programs to be used by the CPU 201, processing parameters and so on. The RAM 203 temporarily stores programs to be used in the execution of the CPU 201, parameters that vary in the execution and so on. The CPU 201, the ROM 202 and the RAM 203 are connected to one another through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from one another, and their functions may be implemented by one bus.

The input device 208 may include input means for a user to input information, such as a mouse, a keyboard, a touch panel, a button, a microphone, a switch or a lever, and an input control circuit for generating an input signal based on a user input and outputting it to the CPU 201, for example. A user of the PC 20 manipulates the input device 208 to thereby input various kinds of data or instruct processing operations to the PC 20.

The output device 210 may include a display device such as a CRT (Cathode Ray Tube) display device, an LCD (Liquid Crystal Display) device, an OLED (Organic Light Emitting Display) device or a lamp, for example. Further, the output device 210 may include an audio output device such as a speaker or a headphone, for example. The output device 210 outputs reproduced contents, for example. Specifically, the display device displays various kinds of information such as reproduced video data by texts or images. On the other hand, the audio output device converts reproduced audio data or the like into sound and outputs the sound.

The storage device 211 is a device for data storage that is configured as an example of a storage unit of the PC 20 according to the present embodiment. The storage device 211 may include a storage medium, a recording device to record data into the storage medium, a reading device to read data from the storage medium, a deleting device to delete data recorded in the storage medium or the like. The storage device 211 may be an HDD (Hard Disk Drive), for example. The storage unit 211 drives a hard disk and stores programs to be executed by the CPU 201 and various data.

The drive 212 is a reader/writer for a storage medium, and it may be incorporated into the PC 20 or attached thereto externally. The drive 212 reads information recorded in a removable storage medium 24 such as a magnetic disk, an optical disk, a magneto-optical disk or a semiconductor memory which is attached thereto and outputs the information to the RAM 203. Further, the drive 212 can write information into the removable storage medium 24.

The communication device 215 is a communication interface configured by a communication device or the like to establish a connection with a nearby wireless communication device or a network, for example. The communication device 215 may be a communication device compatible with a wireless LAN (Local Area Network), a communication device compatible with LTE (Long Term Evolution), or a wire communication device that performs wired communication.

Additionally, although the hardware configuration of the PC 20 has been described above with reference to FIG. 5, the hardware of the display device 10 may be configured in substantially the same manner as that of the PC 20, and an explanation thereof is omitted.

3. First Embodiment

In the foregoing, the hardware configuration of the PC 20 and the display device 10 has been described with reference to FIG. 5. Next, a first embodiment of the present disclosure will be described with reference to FIGS. 6 to 11.

3-1. Configurations of PC and Display Device

Figure 6:
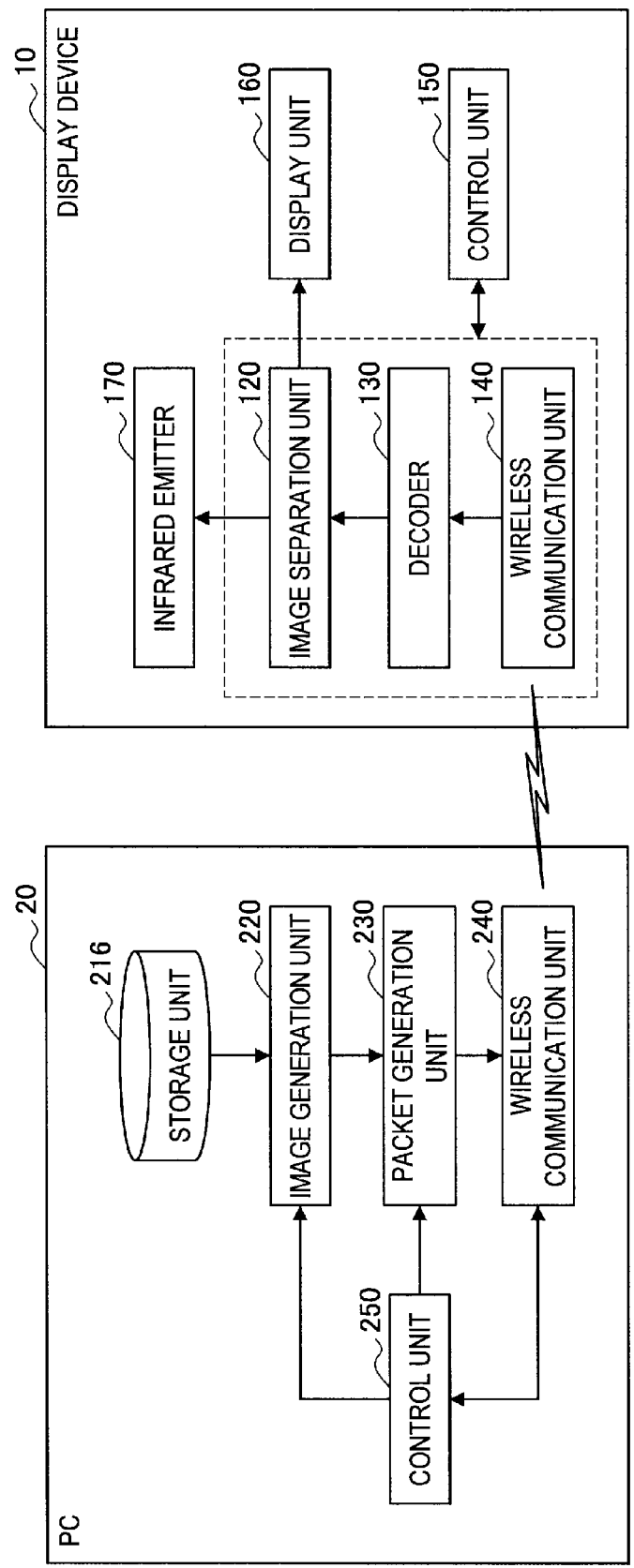
FIG. 6 is a functional block diagram showing configurations of a display device and a PC according to an embodiment of the present disclosure.

FIG. 6 is a functional block diagram showing configurations of the display device 10 and the PC 20 according to the embodiment of the present disclosure. As shown in FIG. 6, the display device 10 includes an image separation unit 120, a decoder 130, a wireless communication unit 140, a control unit 150, a display unit 160, and an infrared emitter 170. Also, the PC 20 includes a storage unit 216, an image generation unit 220, a packet generation unit 230, a wireless communication unit 240, and a control unit 250.

The storage unit 216 of the PC 20 stores content data such as a 3D image composed of an L image and the R image. Such a storage unit 216 may be a storage medium such as a non-volatile memory, a magnetic disk, an optical disk, a magneto-optical (MO) disk, or the like. As the non-volatile memory, an EEPROM (Electrically Erasable Programmable Read-Only Memory), and an EPROM (Erasable Programmable ROM) may be cited, for example. Also, as the magnetic disk, a hard disk, a discoid magnetic disk, and the like may be cited. Furthermore, as the optical disk, a CD (Compact Disc), a DVD-R (Digital Versatile Disc Recordable), a BD (Blu-Ray Disc (registered trademark)), and the like may be cited.

The image generation unit (frame image generation unit) 220 generates one frame image by arranging next to each other an L image and an R image supplied from the storage unit 216, for example. At this time, the image generation unit 220 arranges the L image and the R image in such a way that the boundary between the L image and the R image coincides with the boundaries of the macroblocks, which are the units for frame image compression, as will be described later in detail.

The packet generation unit 230 generates packets for wirelessly transmitting image data composed of a plurality of frame images supplied from the image generation unit 220. In the following, the detailed configuration of this packet generation unit 230 will be described with reference to FIGS. 7 and 8.

Figure 7:
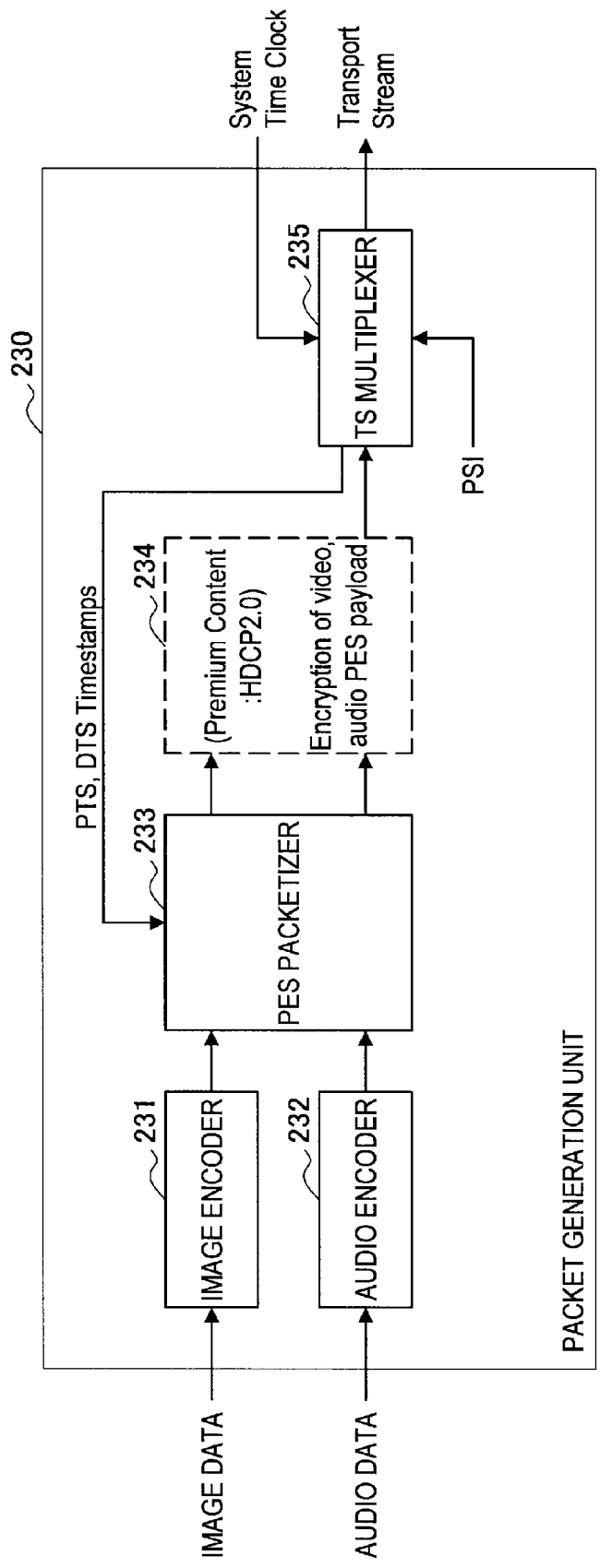
FIG. 7 is an explanatory diagram showing a configuration of a packet generation unit.

FIG. 7 is an explanatory diagram showing a configuration of the packet generation unit 230. As shown in FIG. 7, the packet generation unit 230 includes an image encoder 231, an audio encoder 232, a PES packetizer 233, an encryption processing unit 234, and a TS multiplexer 235.

The image encoder 231 is a compression processing unit that compression encodes and outputs supplied image data. Similarly, the audio encoder 232 compression encodes and outputs supplied audio data. Additionally, the image encoder 231 and the audio encoder 232 are capable of changing the rate of compression of respective data items according to an instruction from the control unit 250.

The PES packetizer 233 generates PES packets from the image data output from the image encoder 231 and the audio data output from the audio encoder 232. More specifically, the PES packetizer 233 generates a PES packet composed of PES header and PES payload, as shown in (1) of FIG. 8. The PES header includes a field for describing timing information such as DTS (Decoding Time Stamp), PTS (Presentation Time Stamp), or the like.

The encryption processing unit 234 encrypts the PES packet supplied from the PES packetizer 233 and outputs the same. The encryption processing unit 234 may encrypt the PES packet by HDCP (High-bandwidth Digital Content Protection) system 2.0, for example.

Figure 8:
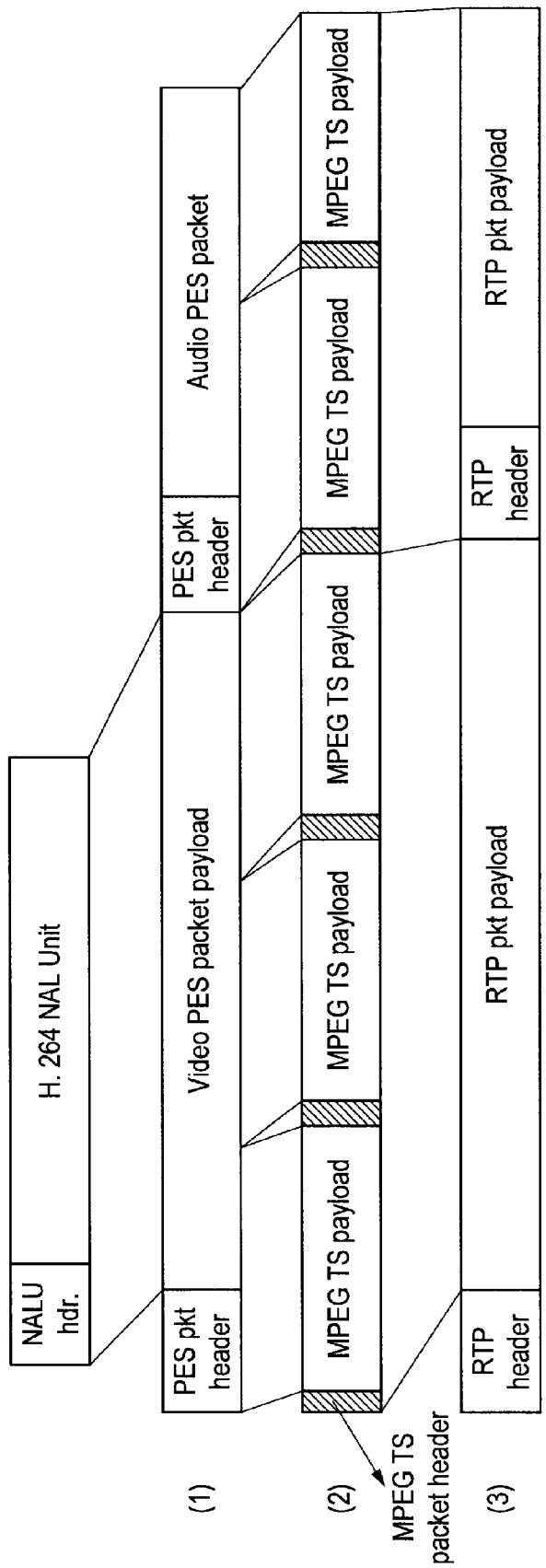
FIG. 8 is an explanatory diagram showing a packet structure.

The TS multiplexer 235 generates a TS stream composed of TS header and TS payload, as shown in (2) of FIG. 8. Additionally, the TS payload is obtained by dividing the PES packet into 188-byte fixed lengths, for example. This TS stream is transmitted as an RTP packet in which RTP header is added, as shown in (3) of FIG. 8.

The wireless communication unit 240 wirelessly transmits the RTP packet containing the image data generated by the packet generation unit 230, the control data designated by the control unit 250, and the like. This wireless communication unit 240 may operate according to Wi-Fi Direct under Wi-Fi Alliance, for example.

The control unit 250 controls the overall operation of the PC 20. For example, the control unit 250 controls the method of storing the L image and the R image by the image generation unit 220, the rate of data compression at the packet generation unit 230, and the wireless communication by the wireless communication unit 240.

The wireless communication unit 140 of the display device 10 receives from the PC 20 the RTP packet containing the image data, the control data, and the like. This wireless communication unit 140 may operate according to Wi-Fi Direct under Wi-Fi Alliance standard development, for example.

The decoder 130 interprets the RTP packet received by the wireless communication unit 140 and decodes the image data and the like contained in the RTP packet. That is, the decoder 130 decodes a plurality of frame images constituting the image data and supplies the same to the image separation unit 120. The macroblocks of each frame image here do not extend across the L image and the R image, and thus corruption caused at the time of occurrence of a data loss in one macroblock can be confined to one part.

The image separation unit 120 separates the L image and the R image from the frame image decoded by the decoder 130 and alternately supplies the L image and the R image to the display unit 160, for example. Additionally, information indicating the L image effective area and the R image effective area within the frame image may be transmitted from the PC 20, and the image separation unit 120 may separate the L image and the R image from the frame image according to this information.

The control unit 150 controls the overall operation of the display device 10. For example, the control unit 150 controls the wireless communication by the wireless communication unit 140, the decoding processing by the decoder 130, the image separation processing by the image separation unit 120, and the like.

The display unit 160 displays the L image and the R image supplied from the image separation unit 120. Also, the infrared emitter 170 issues a control signal for controlling the shutter operation of the shutter glasses 30. The shutter glasses 30 perform the opening/closing operation of the R image transmission unit 32 and the L image transmission unit 34 based on this shutter control signal. Particularly, the shutter operation is performed in such a way that the L image transmission unit 34 is open while the L image is displayed on the display unit 160 and the R image transmission unit 32 is open while the R image is displayed on the display unit 160.

(Frame Image Generation)

The generation process of the frame image by the image generation unit 220 will be described here in detail.

The image generation unit 220 generates the frame image by arranging the L image and the R image next to each other in the vertical direction, for example. Since, according to AVC standard, only one effective pixel area can be defined in one frame image, the image generation unit 220 causes the L image and the R image to be adjacent to each other. Also, the image generation unit 220 causes the boundary between the L image and the R image to coincide with the boundaries of the macroblocks, which are the units for image compression by the image encoder 231, by inserting dummy data to the upper side and the lower side of the L image and the R image that are arranged adjacent to each other.

More particularly, the image generation unit 220 may insert the dummy data by following the procedure below.

(1) Calculate the number of macroblocks necessary to store the L image or the R image along the vertical direction by dividing the number of pixels of the L image or the R image along the vertical direction by 16 (the number of pixels of a macroblock) and rounding up the decimal point of the division result.

(2) Calculate the double value of the number of macroblocks and multiply the same by 16, which is the number of pixels of a macroblock.

(3) Distribute as the dummy data, to the upper side and the lower side, the difference between the multiplication result and the number of effective pixels of the frame image in the vertical direction.

Here, in the case the number of effective pixels in the vertical direction is the same for the L image and the R image, the image generation unit 220 distributes the dummy data equally to the upper side and the lower side. On the other hand, in the case the number of effective pixels in the vertical direction is different for the L image and the R image, the image generation unit 220 distributes more dummy data to the side on which an image with fewer effective pixels is arranged than on the other side.

Additionally, when calculating the number of macroblocks necessary to store the combined image of the L image and the R image by dividing the number of pixels, of the combined image of the L image and the R image, in the vertical direction by 16, a case is conceivable where the calculation results in an odd number. If the number of necessary macroblocks is an odd number, it will be hard to make the boundary between the L image and the R image coincide with the boundaries of the macroblocks, and so it is effective to double the number of macroblocks necessary to store the L image or the R image along the vertical direction, as described above.

Furthermore, if the number of effective pixels of the L image in the vertical direction and the number of effective pixels of the R image in the vertical direction are each an integral multiple of the number of pixels of a macroblock in the vertical direction, the boundary between the L image and the R image will coincide with the boundaries of the macroblocks even if the dummy data is not inserted. Accordingly, the embodiment of the present disclosure can be said to be particularly effective in the case neither the number of effective pixels of the L image in the vertical direction nor the number of effective pixels of the R image in the vertical direction is the integral multiple of the number of pixels of a macroblock in the vertical direction, that is, in the case the number of effective pixels of the frame image in the vertical direction is not an even multiple of the number of effective pixels of the macroblock in the vertical direction.

In the following, a concrete example of the frame image generated by such an image generation unit 220 will be described with reference to FIGS. 9 and 10.

Figure 9:
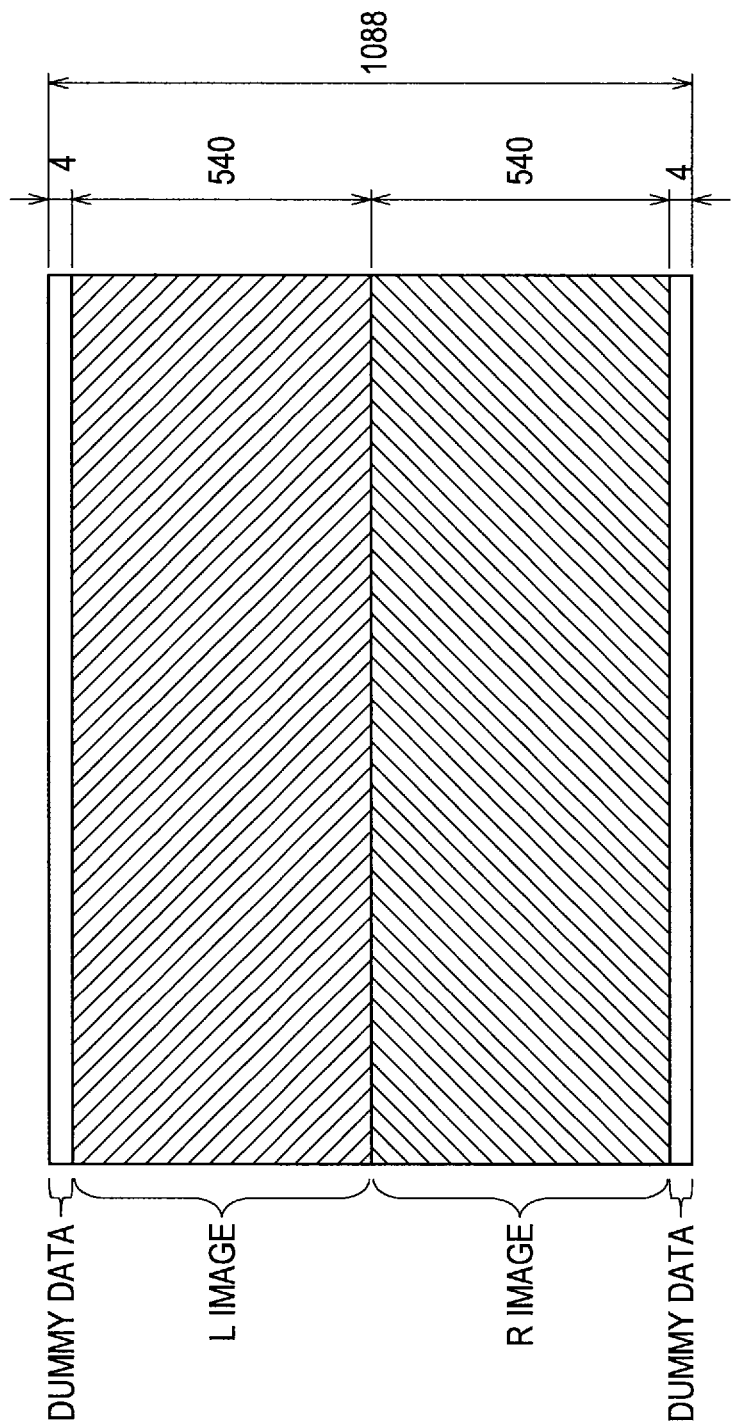
FIG. 9 is an explanatory diagram showing a concrete example of a frame image generated by an image generation unit.
Figure 10:
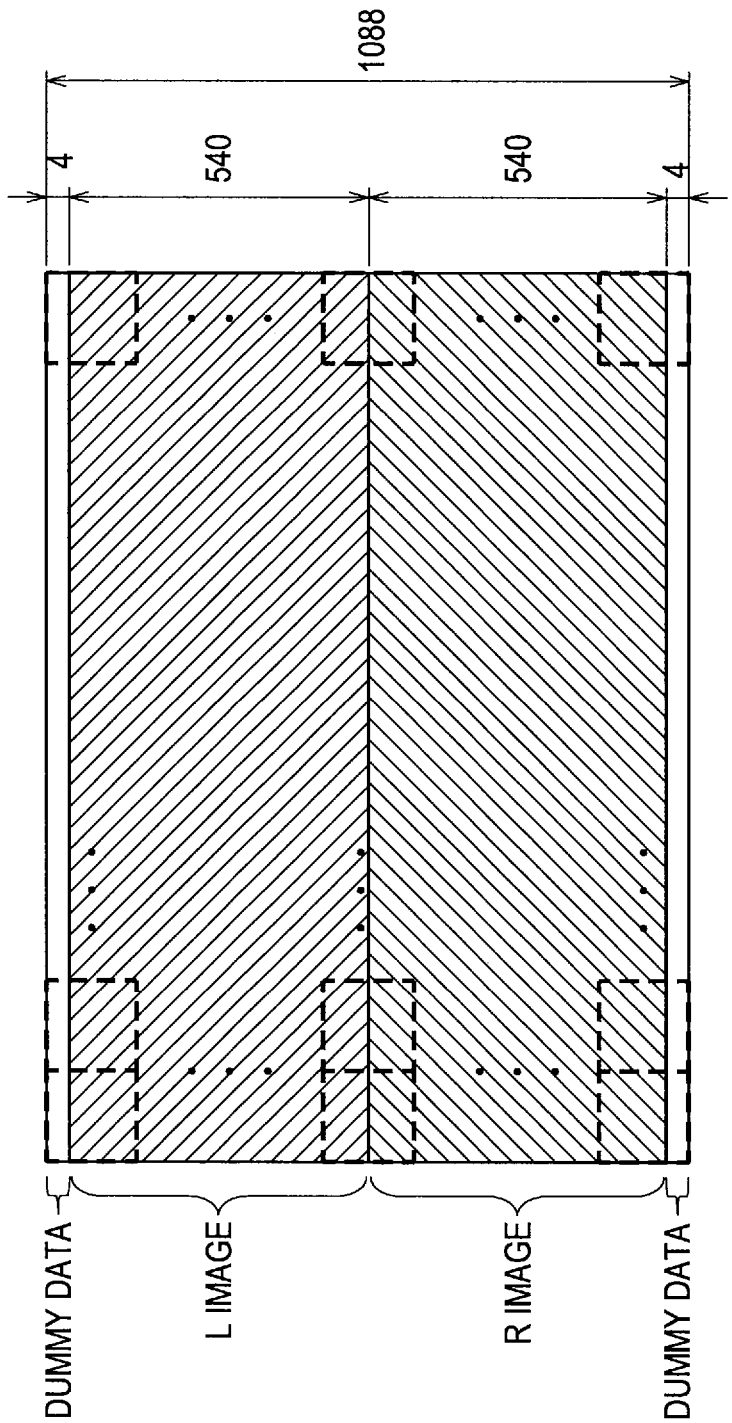
FIG. 10 is an explanatory diagram showing a concrete example of a frame image generated by the image generation unit.

FIGS. 9 and 10 are explanatory diagrams showing a concrete example of the frame image generated by the image generation unit 220. In the case the number of effective pixels in the vertical direction is 540 for the L image and for the R image, the image generation unit 220 inserts dummy data equivalent to 4 pixels to the upper side of the L image and to the lower side of the R image according to the procedure described above, as shown in FIG. 9. As a result, the boundary between the L image and the R image coincides with the boundaries of the macroblocks, as shown in FIG. 10.

According to this configuration, the L image and the R image may be compressed independently of each other. This enables, even in the case where the lower portion of the L image is a still image over a plurality of frame images and the upper portion of the R image includes movement, to compress the lower portion of the L image while maintaining it in a stable state of a still image. Also, corruption caused at the time of occurrence of a data loss in one macroblock can be confined to one part.

3-2. Operations of PC and Display Device

In the foregoing, the configuration of the first embodiment of the present disclosure has been described. Next, operations of the display device 10 and the PC 20 according to the first embodiment will be briefly described with reference to FIG. 11.

Figure 11:
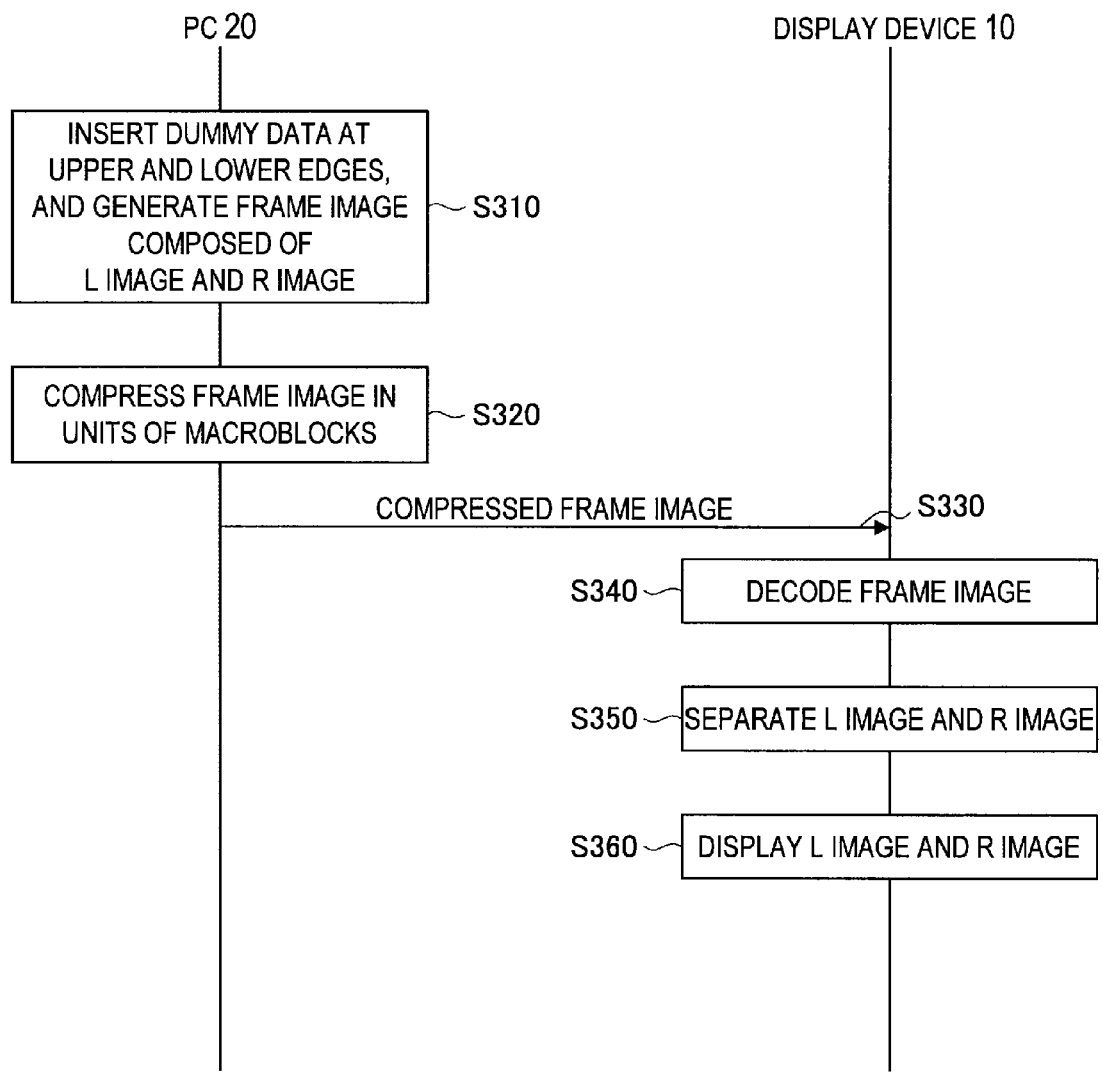
FIG. 11 is a flow chart showing operations of a display device and a PC according to a first embodiment of the present disclosure.

FIG. 11 is a flow chart showing operations of the display device 10 and the PC 20 according to the first embodiment of the present disclosure. As shown in FIG. 11, first, the image generation unit 220 of the PC 20 generates a frame image by inserting dummy data so that the boundary between the L image and the R image coincides with the boundaries of the macroblocks (S310).

Then, the image encoder 231 of the PC 20 compresses the frame image in units of macroblocks (S320), and the wireless communication unit 240 transmits an RTP packet containing the compressed frame image to the display device 10 (S330).

Then, the decoder 130 of the display device 10 decodes the compressed frame image (S340), the image separation unit 120 separates the L image and the R image from the frame image (S350), and the display unit 160 alternately displays the L image and the R image, which have been separated by the image separation unit 120 (S360).

4. Second Embodiment

In the foregoing, the first embodiment of the present disclosure has been described. A process for the case where the L image and the R image are arranged according to the top-and-bottom method has been described in the first embodiment, but, as will be described below as a second embodiment, the present technology is also applicable to a case where the L image and the R image are arranged according to the side-by-side method.

To be specific, the image generation unit 220 generates the frame image by arranging the L image and the R image next to each other in the horizontal direction, for example. Furthermore, the image generation unit 220 makes the boundary between the L image and the R image coincides with the boundaries of the macroblocks, which are the units of image compression by the image encoder 231, by inserting dummy data on the left side and the right side of the L image and the R image that are arranged adjacent to each other.

More particularly, the image generation unit 220 may insert the dummy data by following the procedure below.

(1) Calculate the number of macroblocks necessary to store the L image or the R image along the horizontal direction by dividing the number of pixels of the L image or the R image along the horizontal direction by 16 (the number of pixels of a macroblock) and rounding up the decimal point of the division result.

(2) Calculate the double value of the number of macroblocks and multiply the same by 16, which is the number of pixels of a macroblock.

(3) Distribute as the dummy data, to the left side and the right side, the difference between the multiplication result and the number of effective pixels of the frame image in the horizontal direction.

Here, in the case the number of effective pixels in the horizontal direction is the same for the L image and the R image, the image generation unit 220 distributes the dummy data equally to the left side and the right side. On the other hand, in the case the number of effective pixels in the horizontal direction is different for the L image and the R image, the image generation unit 220 distributes more dummy data to the side on which an image with fewer effective pixels is arranged than on the other side.

Additionally, if the number of effective pixels of the L image in the horizontal direction and the number of effective pixels of the R image in the horizontal direction are each an integral multiple of the number of pixels of a macroblock in the horizontal direction, the boundary between the L image and the R image will coincide with the boundaries of the macroblocks even if the dummy data is not inserted. Accordingly, the embodiment of the present disclosure can be said to be particularly effective in the case neither the number of effective pixels of the L image in the horizontal direction nor the number of effective pixels of the R image in the horizontal direction is the integral multiple of the number of pixels of a macroblock in the horizontal direction, that is, in the case the number of effective pixels of the frame image in the horoizontal direction is not an even multiple of the number of effective pixels of the macroblock in the horizontal direction.

In the following, a concrete example of the frame image generated by such an image generation unit 220 will be described with reference to FIGS. 12 and 13.

Figure 12:
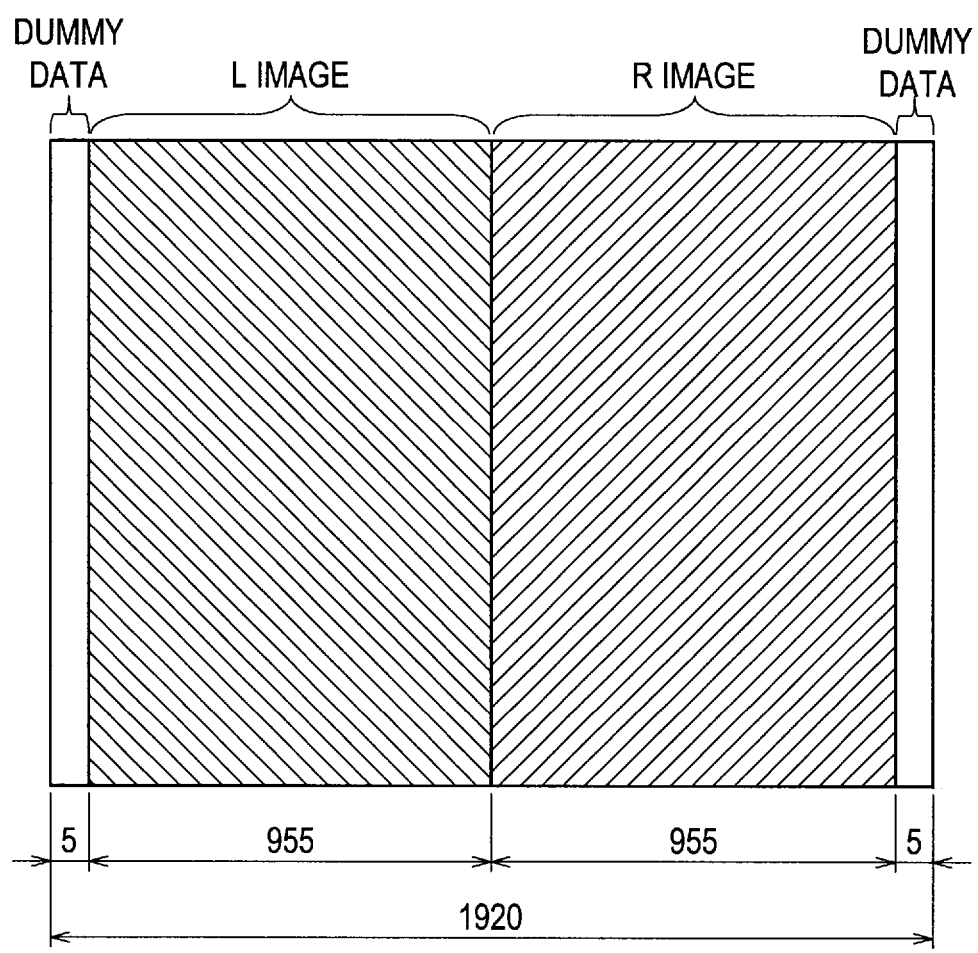
FIG. 12 is an explanatory diagram showing a concrete example of a frame image generated by the image generation unit.
Figure 13:
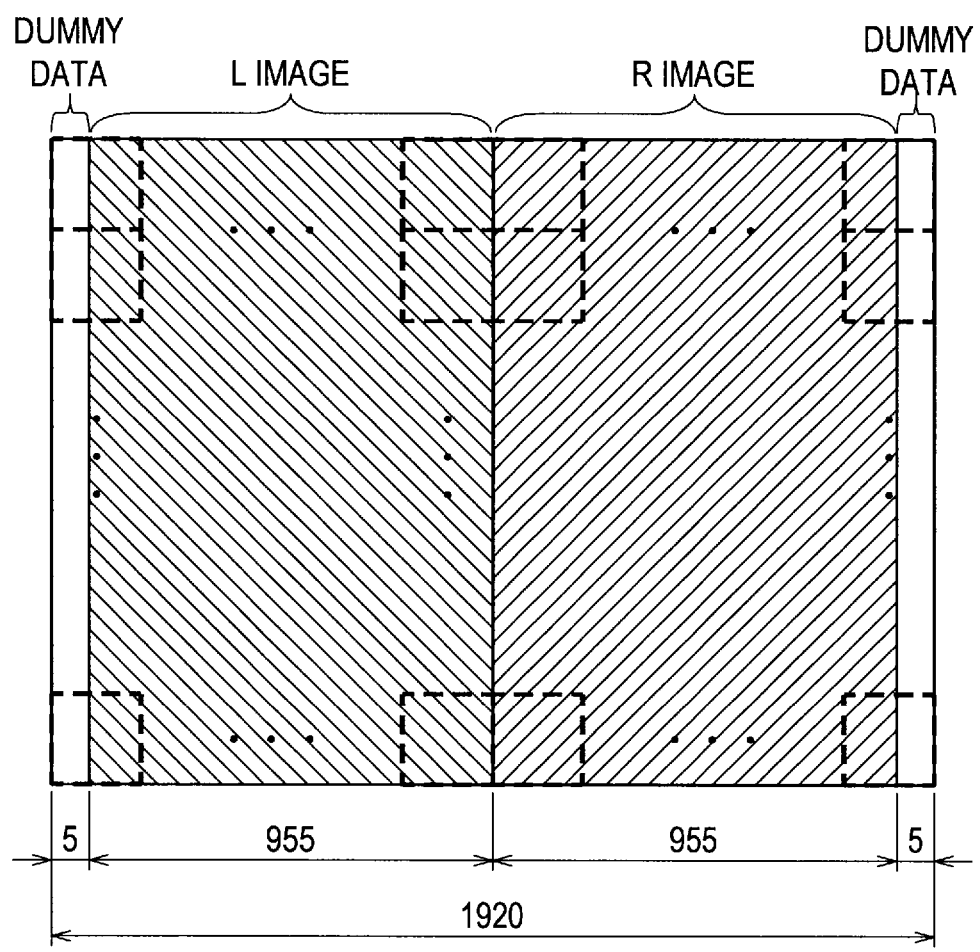
FIG. 13 is an explanatory diagram showing a concrete example of a frame image generated by the image generation unit.

FIGS. 12 and 13 are explanatory diagrams showing a concrete example of the frame image generated by the image generation unit 220. In the case the number of effective pixels in the horizontal direction is 955 for the L image and the for the R image, the image generation unit 220 inserts dummy data equivalent to 5 pixels to the left side of the L image and the right side of the R image according to the procedure described above, as shown in FIG. 12. As a result, the boundary between the L image and the R image coincides with the boundaries of the macroblocks, as shown in FIG. 13.

According to this configuration, the L image and the R image may be compressed independently of each other. This enables, even in the case where the right portion of the L image is a still image over a plurality of frame images and the left portion of the R image includes movement, to compress the right portion of the L image while maintaining it in a stable state of a still image. Also, corruption caused at the time of occurrence of a data loss in one macroblock can be confined to one part.

5. Conclusion

As described above, the image generation unit 220 according to the embodiment of the present disclosure generates a frame image by inserting dummy data in such a way that the boundary between the L image and the R image coincides with the boundaries of the macroblocks. According to this configuration, the L image and the R image may be compressed independently of each other. Also, corruption caused at the time of occurrence of a data loss in one macroblock can be confined to one part.

It should be understood by those skilled in the art that various modifications, combinations, sub-combinations and alterations may occur depending on design requirements and other factors insofar as they are within the scope of the appended claims or the equivalents thereof.

For example, the steps of the processing of the display device 10 and the PC 20 according to the present specification do not necessarily have to be processed chronologically according to the order described as the flow chart. For example, the steps of the processing of the display device 10 and the PC 20 can also be processed in an order different from that described as the flow chart or may be processed in parallel.

Furthermore, a computer program for causing hardware, such as the CPU 201, the ROM 202, or the RAM 203, embedded in the display device 10 and the PC 20 to realize an equivalent function as each element of the display device 10 and the PC 20 described above can also be created. Furthermore, a storage medium storing the computer program is also provided.

What is claimed is:

1. An image processing device comprising:
   a frame image generation device to generate a frame image in which a first image and a second image are arranged next to each other; and
   a compression processing device to compress the frame image in units of macroblocks,
   wherein each of the macroblocks has a same predetermined pixel area size, and
   wherein the frame image generation device causes an image boundary between the first image and the second image to coincide with boundaries of a number of the macroblocks by inserting an amount of dummy data to both sides of the first image and the second image which are opposite the image boundary so as to have a whole number of macroblocks in the first image and in the second image along a direction of arrangement.

2. The image processing device according to claim 1,
   wherein the frame image generation device
      multiplies a double value of the number of macroblocks necessary to store the first image or the second image along the direction of arrangement by the number of pixels of the macroblock in the direction of arrangement, and
      distributes as the dummy data, to both sides of the frame image in the direction of arrangement, a difference between a multiplication result and the number of effective pixels of the frame image in the direction of arrangement.

3. The image processing device according to claim 2,
   wherein the frame image generation device
      distributes, in a case the numbers of effective pixels of the first image and the second image along the direction of arrangement are same, the dummy data equally to both sides of the frame image in the direction of arrangement, and
      distributes, in a case the numbers of effective pixels of the first image and the second image along the direction of arrangement are different, more dummy data to an arrangement side of an image with a fewer number of effective pixels than on another side.

4. The image processing device according to claim 3, further comprising:
   a wireless communication device for wirelessly transmitting the frame image which has been compressed by the compression processing device.

5. The image processing device according to claim 3,
   wherein the number of effective pixels of the frame image in the direction of arrangement is different from an even multiple of the number of pixels of the macroblock in the direction of arrangement.

6. The image processing device according to claim 4,
   wherein the first image is an image for a left eye and the second image is an image for a right eye.

7. An image processing method comprising:
   generating a frame image in which a first image and a second image are arranged next to each other; and
   compressing the frame image in units of macroblocks,
   wherein each of the macroblocks has a same predetermined pixel area size, and
   wherein the generating includes causing an image boundary between the first image and the second image to coincide with boundaries of a number of the macroblocks by inserting an amount of dummy data to both sides of the first image and the second image which are opposite the image boundary so as to have a whole number of macroblocks in the first image and in the second image along a direction of arrangement.

8. A non-transitory computer readable medium having stored thereon a program for causing a computer to function as an image processing device including:
   a frame image generation unit for generating a frame image in which a first image and a second image are arranged next to each other; and
   a compression processing unit for compressing the frame image in units of macroblocks,
   wherein each of the macroblocks has a same predetermined pixel area size, and
   wherein the frame image generation unit causes an image boundary between the first image and the second image to coincide with boundaries of a number of the macroblocks by inserting an amount of dummy data to both sides of the first image and the second image which are opposite the image boundary so as to have a whole number of macroblocks in the first image and in the second image along a direction of arrangement.

9. The image processing device according to claim 1, wherein the predetermined pixel area size of each of the macroblocks is 16 pixels×16 pixels.

10. The image processing method according to claim 7, wherein the predetermined pixel area size of each of the macroblocks is 16 pixels×16 pixels.

11. The non-transitory computer readable medium according to claim 8, wherein the predetermined pixel area size of each of the macroblocks is 16 pixels×16 pixels.

12. The image processing device according to claim 1,
   in which the first image and the second image are arranged next to each other in a vertical direction, and
   in which the first image and the second image are arranged such that the boundaries of the number of macroblocks coincide with both sides of the first image and the second image in the vertical direction.

* * * * *